(12) United States Patent
Gillespie et al.

(10) Patent No.: US 11,516,300 B2
(45) Date of Patent: Nov. 29, 2022

(54) SYSTEM, METHOD AND PROGRAM FOR LOCALIZING WEB PAGE INTERFACES VIA ASYNCHRONOUS DATA AND AUTOMATIC BINDING

(71) Applicant: Hughes Network Systems LLC, Germantown, MD (US)

(72) Inventors: Bryan Gillespie, Gaithersburg, MD (US); Wing Zhen, Clarksburg, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 436 days.

(21) Appl. No.: 15/365,431

(22) Filed: Nov. 30, 2016

(65) Prior Publication Data

US 2018/0152542 A1    May 31, 2018

(51) Int. Cl.
*H04L 67/00* (2022.01)
*H04L 67/02* (2022.01)
*H04L 67/01* (2022.01)
*H04L 67/52* (2022.01)

(52) U.S. Cl.
CPC .............. *H04L 67/34* (2013.01); *H04L 67/01* (2022.05); *H04L 67/02* (2013.01); *H04L 67/52* (2022.05)

(58) Field of Classification Search
CPC ......... H04L 67/34; H04L 67/02; H04L 67/18; H04L 67/42
USPC ................................ 709/219, 202, 217, 246
See application file for complete search history.

(56) References Cited

U.S. PATENT DOCUMENTS

| | | | | |
|---|---|---|---|---|
| 6,623,529 | B1* | 9/2003 | Lakritz ................... | G06F 40/47 715/205 |
| 6,983,313 | B1* | 1/2006 | Korkea-Aho ....... | G06F 16/9537 709/219 |
| 7,580,960 | B2* | 8/2009 | Travieso ............... | G06F 40/205 707/999.102 |
| 7,590,681 | B1* | 9/2009 | Chang .................... | H04W 4/02 709/203 |
| 7,640,512 | B1* | 12/2009 | Appling ............. | G06F 16/9577 715/771 |
| 7,792,297 | B1* | 9/2010 | Piccionelli ............. | H04L 67/18 380/258 |
| 8,266,000 | B1* | 9/2012 | Harris .................... | G06Q 30/08 705/26.3 |
| 8,640,023 | B1* | 1/2014 | Murray ................. | G06F 40/169 715/232 |
| 8,700,633 | B1* | 4/2014 | Murphy ................. | G06F 16/29 707/740 |
| 8,756,050 | B1* | 6/2014 | Harkness ............... | G06F 40/58 704/2 |

(Continued)

*Primary Examiner* — Madhu Woolcock
(74) *Attorney, Agent, or Firm* — Global IP Counselors, LLP

(57) ABSTRACT

A system, method and program for localizing web page interfaces via asynchronous data and automatic binding. The system, method and program employ a terminal for use with a communication network. The terminal comprises a server that is configured to bind web page core data representing a web page with locale data local to the terminal to create web page data. The locale data pertains to a location in which the terminal is disposed. The server is further configured to bind different locale data with the web page core data to create modified web page data.

21 Claims, 3 Drawing Sheets

(56) References Cited

U.S. PATENT DOCUMENTS

| | | | |
|---|---|---|---|
| 9,003,540 B1* | 4/2015 | Johansson | H04L 63/0807 726/26 |
| 9,197,696 B1* | 11/2015 | Jakatdar | H04L 67/06 |
| 9,454,618 B1* | 9/2016 | Chen | G06F 40/14 |
| 9,503,499 B1* | 11/2016 | Donaldson | H04L 67/02 |
| 9,658,998 B2* | 5/2017 | Dillard | G06F 40/186 |
| 9,805,135 B2* | 10/2017 | Hamm | G06F 16/957 |
| 2002/0023010 A1* | 2/2002 | Rittmaster | G06F 16/9537 705/26.1 |
| 2004/0102197 A1* | 5/2004 | Dietz | G06Q 30/0261 455/456.1 |
| 2005/0021862 A1* | 1/2005 | Schroeder | G06Q 30/02 709/219 |
| 2005/0289178 A1* | 12/2005 | Angus | G06F 16/957 |
| 2006/0047728 A1* | 3/2006 | Kim | G06F 16/957 |
| 2006/0184640 A1* | 8/2006 | Hatch | G06Q 30/02 709/217 |
| 2006/0206594 A1* | 9/2006 | Brown | H04L 12/4625 709/220 |
| 2007/0067495 A1* | 3/2007 | Levy | G06F 16/9574 709/246 |
| 2008/0235351 A1* | 9/2008 | Banga | H04W 4/029 709/218 |
| 2009/0070190 A1* | 3/2009 | Gorty | G06Q 30/0241 705/14.6 |
| 2009/0187830 A1* | 7/2009 | Jorasch | G06Q 10/10 715/751 |
| 2009/0287471 A1* | 11/2009 | Bennett | G06F 40/263 704/3 |
| 2009/0287671 A1* | 11/2009 | Bennett | G06F 16/951 |
| 2010/0131366 A1* | 5/2010 | Gibson | G06Q 30/06 705/14.58 |
| 2010/0180330 A1* | 7/2010 | Zhu | G06F 21/335 726/10 |
| 2010/0191545 A1* | 7/2010 | Heinert | G06F 8/63 705/3 |
| 2010/0192070 A1* | 7/2010 | Peckelbeen | G06F 9/454 715/748 |
| 2010/0262914 A1* | 10/2010 | Todd | G06F 16/9577 715/729 |
| 2010/0286977 A1* | 11/2010 | Chin | G06F 40/58 704/4 |
| 2011/0034184 A1* | 2/2011 | Rothschild | H04W 4/02 455/456.3 |
| 2011/0125724 A1* | 5/2011 | Mo | G06F 16/9535 707/706 |
| 2011/0172987 A1* | 7/2011 | Kent | G06F 40/58 704/E11.001 |
| 2011/0313755 A1* | 12/2011 | Oh | G06F 16/9535 704/3 |
| 2012/0135753 A1* | 5/2012 | Wang | H04W 52/0206 455/456.1 |
| 2012/0157199 A1* | 6/2012 | Nord | G07F 17/3293 463/31 |
| 2012/0185236 A1* | 7/2012 | Blodgett | G06F 40/58 704/2 |
| 2012/0190385 A1* | 7/2012 | Nair | H04W 4/043 455/456.3 |
| 2013/0091425 A1* | 4/2013 | Hughes | G06F 40/242 715/259 |
| 2013/0290516 A1* | 10/2013 | Eaton | G06F 16/958 709/224 |
| 2014/0156725 A1* | 6/2014 | Mandyam | H04L 67/145 709/203 |
| 2014/0181634 A1* | 6/2014 | Compain | G06F 3/0481 715/234 |
| 2014/0358994 A1* | 12/2014 | Liu | H04L 67/26 709/203 |
| 2014/0372099 A1* | 12/2014 | Ronin | G06F 16/95 704/2 |
| 2015/0121199 A1* | 4/2015 | Wu | G06F 40/131 715/239 |
| 2015/0178299 A1* | 6/2015 | Kazerani | G06F 16/9574 709/213 |
| 2015/0278166 A1* | 10/2015 | Hanechak | G06F 40/186 715/234 |
| 2015/0302110 A1* | 10/2015 | Deng | G06F 40/106 715/234 |
| 2016/0117730 A1* | 4/2016 | Nats | G06Q 30/0257 705/14.55 |
| 2017/0199630 A1* | 7/2017 | Perry | G06F 3/0482 |

* cited by examiner

SYSTEM, METHOD AND PROGRAM FOR LOCALIZING WEB PAGE INTERFACES VIA ASYNCHRONOUS DATA AND AUTOMATIC BINDING

BACKGROUND

Field of the Invention

The present invention generally relates to a system, method and program for localizing web page interfaces via asynchronous data and automatic binding. More particularly, the present invention relates to a system, method and program that utilize a backend data-driven functionality with front-end automatic data binding to achieve hot swappable language and region-specific content within a web page without the need to reserve or refresh a web page and without interrupting any of the existing web page functionality. The system, method and program can be employed in any suitable device, such as a satellite communication terminal.

Background Information

Communication networks, such as satellite communication networks, employ satellite communication terminals at end-user sites which communicate with one or more satellites in the satellite communication network. The satellite communication network can function as an Internet service provider which provides content, such as typical web page content, to the satellite communication terminals for access by the end users.

Naturally, the satellite communication terminals, which can be referred to simply as satellite user terminals or user terminals, are dispersed throughout different countries across the world. Therefore, the language in which the user-readable content is provided on the web pages varies from country to country. For instance, content on the web pages being accessed via satellite user terminals in the United States would normally appear in English, while content on the web pages being access via satellite user terminal in Japan would normally appear in Japanese, and so on.

To localize a web page, a communication network would typically create multiple versions of the web page, and then serve the locale-specific version of the web page as requested by the user. Accordingly, the English-language version of the web page would normally be served to the user terminal of the user requesting the web page in the United States, but a Japanese-language version of the web page would normally be served to the user terminal of the user requesting the web page in Japan. However, a user at a specific location may desire for the web page content to be provided in a different language than that of the region. For instance, an American user traveling abroad would most likely want the content of the web page to be provided in English regardless of the region from which the American user is accessing the web page.

SUMMARY

The practice of creating multiple versions of a web page and serving a specific version of the web page as requested by the user is generally costly in terms of bandwidth and load times, especially because the entire web page is built and resent over the satellite communication network any time the language/region context of the web page is switched. This can be particularly problematic for embedded satellite communication networks, since every byte sent over the satellite link noticeably increases the perceived page load times and responsiveness due to the extra work performed by the embedded satellite communication network and the limited resources of the satellite communication network.

In order to address these issues, the disclosed embodiments provide a system, method and program that dramatically improve performance over the traditional methodology discussed above. In accordance with the system, method and program of the disclosed embodiments, base web pages are cacheable in a locale-independent manner at the user terminals. Therefore, a base web page will load much faster in a user's browser since the same static HTML is used for all locales and stored in the browser's cache. Furthermore, the base web page does not need to refresh upon a locale switch. Therefore, less bytes are sent over the satellite link when switching languages, and perceived load times for the web page is dramatically improved. Furthermore, anything currently running in the web page is not disrupted or restarted due to the locale switch since the content being switched is merely "hot swapped." Thus, the back-end embedded system of the satellite communication network completes tasks faster since the network merely sends the switched data, and does not need to rebuild or re-serve an entire web page.

Accordingly, disclosed embodiments provide a system, method and program for localizing web page interfaces via asynchronous data and automatic binding. The system, method and program employ a terminal for use with a communication network. A system, method and program for localizing web page interfaces via asynchronous data and automatic binding. The system, method and program employ a terminal for use with a communication network. The terminal comprises a server that is configured to bind web page core data representing a web page with locale data local to the terminal to create web page data. The locale data pertains to a location in which the terminal is disposed. The server is further configured to bind different locale data with the web page core data to create modified web page data.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

As will be appreciated from the following description, a system, method and program according to disclosed embodiments utilize a backend data-driven functionality with front-end automatic data binding to achieve hot swappable language and region-specific content within a web page without the need to re-serve or refresh a web page and without interrupting any of the existing web page functionality.

Figure 1:
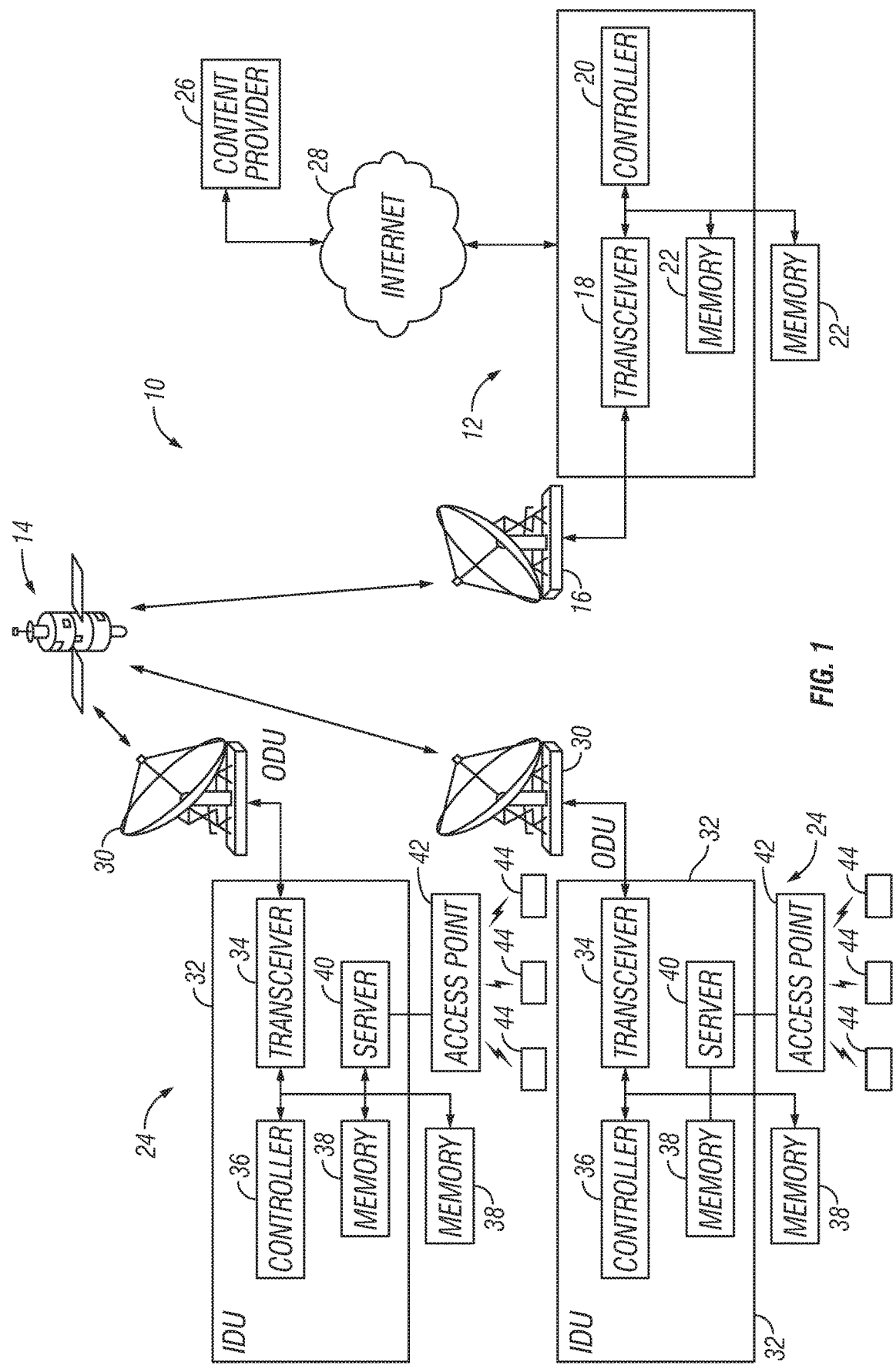
FIG. 1 illustrates an example of a satellite communication network employing a system, method and program according to a disclosed embodiment.

FIG. 1 illustrates an example of a satellite communication network 10 employing a system, method and program according to exemplary embodiments disclosed herein. A satellite communication network 10 typically includes a plurality of terrestrially mounted gateways 12 that communicate with one or more orbiting satellites 14. Each satellite gateway includes an antenna dish 16, a transceiver 18, a controller 20, a memory 22 and other types of equipment (not shown) such as amplifiers, waveguides and so on as understood in the art on which enable communication between the gateway 12 and a plurality of satellite user terminals 24 via one or more of the orbiting satellites 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

The gateway 12, satellites 14 and satellite user terminals 24 typically communicate with each other over a radio frequency link, such as a Ku-band link, a Ka-band link or any other suitable type of link as understood in the art. Also, one or more of the gateways 12 can be configured as a network management center or network operating center which, among other things, operate to communicate with remote sites, such as web content providers 26, via the Internet 28, cloud storage, or other communication networks as understood in the art. In addition, the gateways 12 can communicate with each other via, for example, the Internet 28 or other communication networks.

As further shown in FIG. 1, a satellite user terminal 24 typically includes an antenna dish 30 that is commonly referred to as an outdoor unit (ODU), and a device such as a set-top box or other type of equipment that is commonly referred to as an indoor unit (IDU) 32. The IDU 32 typically includes a transceiver 34, a controller 36, a memory 38, a local server 40 and other types of equipment (not shown) such as amplifiers, waveguides and so on as understood in the art on which enable communication between the satellite user terminal 24 and one or more gateways 12 via one or more of the orbiting satellites 14. A transceiver 34 can include, for example, an integrated satellite modem and any other suitable equipment which enables the transceiver 34 to communicate with one or more of the orbiting satellites 14 as understood in the art. The memory 38 can be, for example, an internal memory in the satellite user terminal 24, or other type of memory devices such as a flash memory or hard drives with external high speed interface such as a USB bus or an SATA bus, or remote memories such as cloud storage and so on. These other types of memory can be present at the satellite user terminal 24 or accessible at a location apart from the satellite user terminal 24 via a network connection such as an Ethernet connection, a WiFi connection or any other suitable type of connection as understood in the art.

As with the controller 20 for a gateway 12, the controller 36 preferably includes a microcomputer with a control program that controls the satellite user terminal 24 as discussed herein. The controller 36 can also include other conventional components such as an input interface circuit, an output interface circuit, and storage devices such as a ROM (Read Only Memory) device and a RAM (Random Access Memory) device. The RAM and ROM store processing results and control programs that are run by the controller 36. The controller 36 is operatively coupled to the components of the satellite user terminal 24 as appropriate, in a conventional manner. It will be apparent to those skilled in the art from this disclosure that the precise structure and algorithms for the controller 36 can be any combination of hardware and software that will carry out the functions of the present invention.

The memory 38 can be, for example, an internal memory in the terminal 24, or other type of memory devices such as a flash memory or hard drives with external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Also, the local server 40 can communicate with an access point 42, such as a WAP or any other suitable device, which enables the local server 40 to provide packets to end user devices 44 as discussed herein. Such end user devices 44 include, for example, desktop computers, laptop or notebook computers, tablets (e.g., iPads), smart phones, Smart TVs and any other suitable devices as understood in the art. Naturally, the communications between the local server 40, the access point 42 and the end user devices 44 can occur over wireless connections, such as WiFi connections, as well as wired connections as understood in the art.

In accordance with the disclosed embodiments, before an IDU 32 is shipped to a location, locale-specific web page content for "internal" type web pages pertaining to the satellite communication network 10 are stored in the memory 38 of the IDU 32. These internal type web pages can be web pages containing information about the company hosting the satellite communication network 10 (e.g., Hughes Network Systems), customer service information, information pertaining to equipment such as the IDU 32, and so on. This information can be stored in a database 46 as shown, for example, in FIG. 2, which can be stored in memory 38 of the IDU 32 or at any other suitable location. The information can be represented in English, for example, in all IDUs 32 that are shipped, and in a locale-specific language based on the region to which the IDU 32 is to be shipped. For instance, an IDU 32 being shipped to Canada can have the information stored in the database 46 in English and French. An IDU 32 being shipped to Brazil can have the information stored in the database 46 in English and Portuguese.

Figure 2:
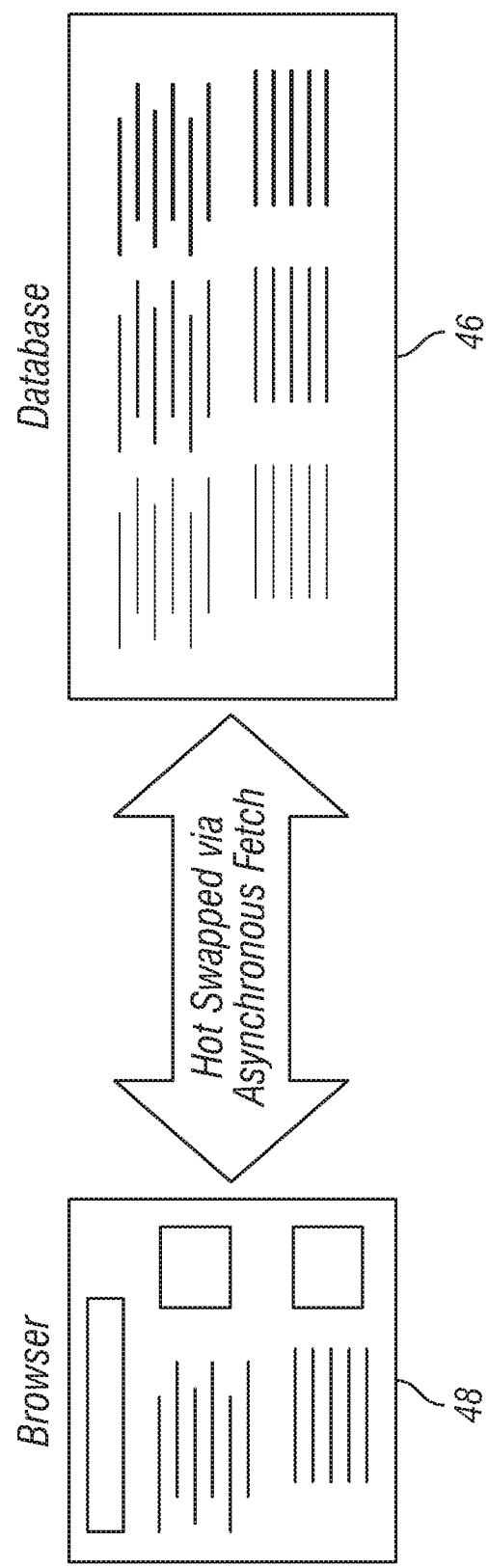
FIG. 2 is a conceptual block diagram illustrating an example of operations associated with swapping content of a web page as performed by the system, method and program of the disclosed embodiment.

As will now be described, the controller 36 and the local server 40, for example, can operate to perform functions of an asynchronous fetching mechanism, an automatic data-binding system, and a data driven backend. The local server 40, for example, can be configured to perform operations of the data driven backend, which operates as a server that is capable of serving data. In this example, the data driven backend functionality of the local server 40 would operate as a web server that can serve the locale-specific data of a given web page without serving the web page itself. The locale-specific data can be, for example, information in a specific language of a region in which the user terminal 24 is present. For instance, a database 50, as shown in FIG. 2, can be stored in memory The asynchronous fetching mechanism is used to make HTTP requests to the backend web server without refreshing the page. The asynchronous fetching mechanism could be, for example, AJAX, WebSockets technology, or any other type of mechanism that permits the same functionality. The automatic data-binding system (ADBS) configured in, for example, the local server 40, enables the static HTML page to be locale-independent, and therefore cacheable. The ADBS takes the data from the asynchronous HTTP request and automatically binds the data to the Document Object Model (DOM). Therefore, the locale-specific page can be hot-swapped, and any currently running functions or tasks in the page are not disrupted. In addition, from a front-end perspective, the HTML is merely written to match the structure of asynchronous data.

Figure 3:
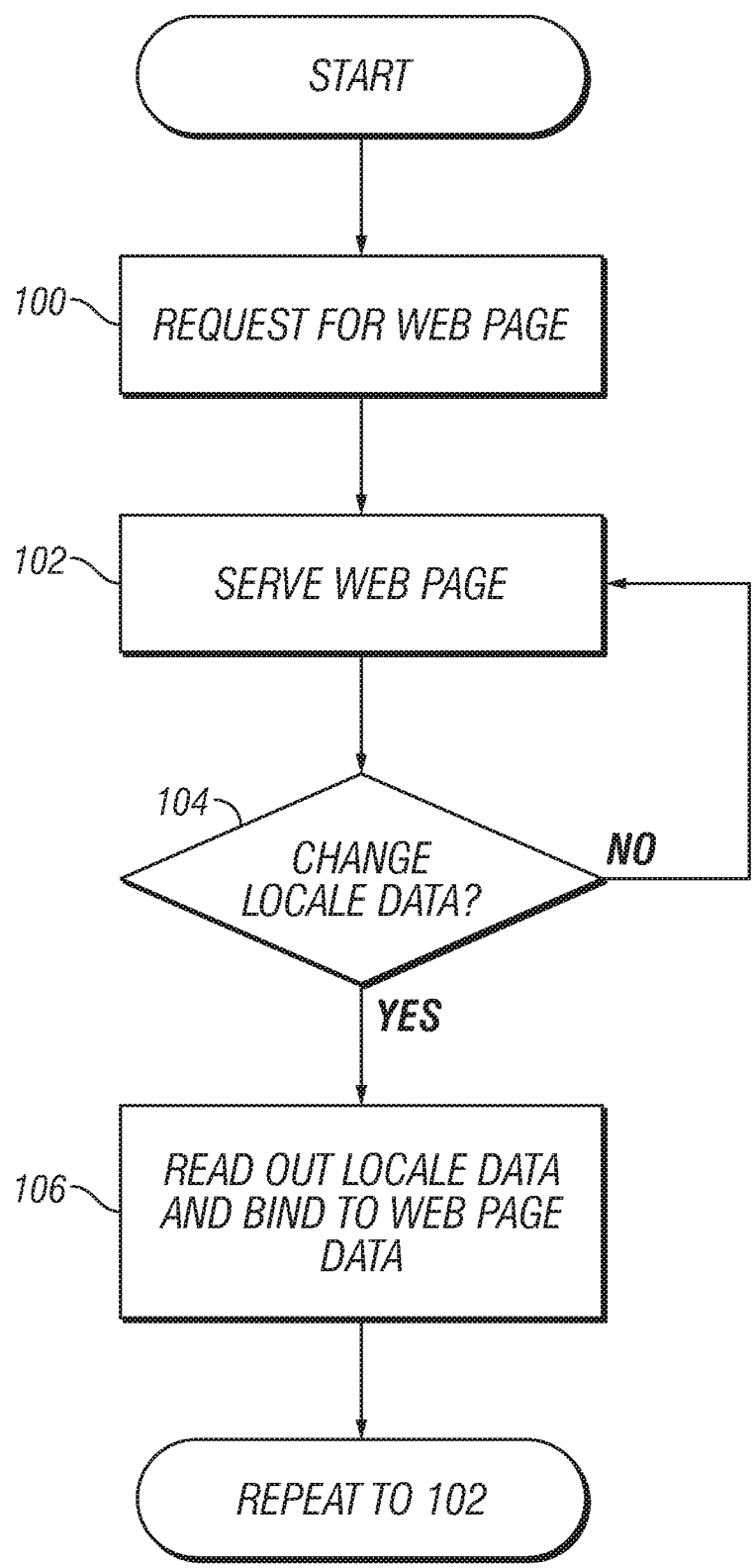
FIG. 3 is a flow chart illustrating an example of operations performed during swapping of the content as shown in FIG. 2.

Accordingly, as shown in the exemplary flow diagram set forth in FIG. 3, when a request for a core web page is made in Step 100, the core web page is served by the local server 40 in Step 102. The transceiver 34 can receive the web page core data from the communication network 10 and provide the web page core data to the server 40. The server 40 can store the web page core data in a cache in, for example, memory 38, upon receiving an initial request for the web page represented by the web page core data, and can retrieve the web page core data from the cache upon receiving a subsequent request for the web page.

The local server 40 serves the core web page if it is the first time that the core web page is being served. For subsequent requests of the core web page, the core web page can be served from the cache which can be included, for example, in the memory 38 of the IDU 32. The local server 40 also retrieves the locale data from the database 46 and the ADBS of the server 40 binds the locale data to the web page automatically. For example, the server 40 automatically converts machine format locale data into readable format on the web page. When a separate asynchronous request to, for example, change the locale-data (e.g., from English to French) is made in step S104, the locale-data is served by the data-driven backend based on user preference or a default in Step 106. The ADBS thus binds the served data to the web page automatically, and the updated web page is displayed in the user's web browser 48 (FIG. 2) of the user's device 44. The updated web page is thus served in Step 102. If it is determined in Step 104 that the user again requests a switch, the operations are repeated as discussed above.

It should be noted that the ADBS can occur in the local server 40 or in the browser 48 itself via, for example, JavaScript libraries running in the browser 48. As understood in the art, ADBS enables changes to locale data (e.g., translated words, sentences, and so on) without having to make any changes to HTML or JavaScript since the ADBS will insure that the data is filled into the web page at the correct location regardless of the actual translated words that appear on the web page.

Accordingly, as can be appreciated from the above, the server 40 binds web page core data representing a web page with locale data retrieved from the database 46 at the terminal to create web page data, with the locale data pertaining to a location (e.g., a geographic region or country) in which the terminal 24 is disposed. The server 40 further, in response to a request, retrieve different locale data from the database 46, and binds the different locale data with the web page core data to create modified web page data without interrupting another function running in the web page core data. The server 40 thus can provide the web page data to a browser 48 of a user device 44, receive the request via the browser 48, and provide the modified web page data to the browser 48.

Although the embodiments are described with regard to a satellite communication network 10 exemplary purposes, the system, method and program according to the disclosed embodiments are operable in LAN settings in addition to satellite-link settings. Table 1 below illustrates an example of measured load times and consumed bandwidth for a comparable web page using traditional CGI localization techniques versus the disclosed embodiments over a satellite connection.

TABLE 1

| Test | Invented System | Traditional CGI Approach |
| --- | --- | --- |
| Locale switch load time | 2-3 s | 13-14 s |
| Amount of locale data transmitted over satellite link per switch | 3.2 KB | 35 KB |

As can be appreciated from the results in Table 1, using a data-driven asynchronous approach according to the disclosed embodiments reduced the load times for a locale switch by a factor of 6, and reduced the amount over data sent over the air by a factor of more than 10. Hence, although a CGI program that builds locale-specific pages can be used, such an approach is costly over a satellite link and increases strain on the embedded system containing the web server.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A terminal for use with a communication network hosted by a company, the terminal comprising:
    a memory located on the terminal, the memory comprising a database with locale data and different locale data pre-stored on the database prior to deployment of the terminal to a particular location, the pre-stored locale data and the pre-stored different locale data associated with static locale-independent web page core data containing information about the company hosting the communication network or a company deploying the terminal, and the pre-stored locale data comprising web page content associated with the static locale-independent web page core data in a language specific to the particular location, and
    a server located on the terminal, the server configured to request, in response to receiving a request for a web page from a browser of a user device separate from the terminal, the static locale-independent web page core data from the communication network, store the static locale-independent web page core data in a cache for retrieval in response to subsequent requests for the web page, and bind the pre-stored locale data with the static locale-independent web page core data to create web page data,
    the server being further configured to transmit the created web page data to the browser of the user device for display, receive a request from the browser to change a language of the created web page data to a language of the pre-stored different locale data, bind the pre-stored different locale data to the static locale-independent web page core data to create modified web page data, and provide the modified web page data to the browser without refreshing the static locale-independent web page core data and without interrupting another function currently being executed in the static locale-independent web page core data.
2. The terminal according to claim 1, further comprising a transceiver, configured to receive the static locale-independent web page core data from the communication network and provide the static locale-independent web page core data to the server.
3. The terminal according to claim 1, wherein the server is further configured to store the static locale-independent web page core data in the cache upon receiving an initial request for the web page, and to retrieve the static locale-independent web page core data from the cache upon receiving a subsequent request for the web page.
4. The terminal according to claim 1, wherein the server is configured to bind the pre-stored different locale data with the static locale-independent web page core data by replacing the pre-stored locale data with the pre-stored different locale data to create the modified web page data while the static locale-independent web page core data is generating an active web page.
5. The terminal according to claim 1, wherein the server provides the modified web page data to the browser without interrupting any functionality of the static locale-independent web page core data.
6. The terminal according to claim 1, wherein the server is configured to retrieve the pre-stored different locale data from the memory to provide the modified web page data to the browser in response to the request from the browser to change the language of the created web page data to the language of the pre-stored different locale data.
7. The terminal according to claim 1, wherein the modified web page data is binded to the static locale-independent web page core data in the browser in response to the request from the browser to change the language of the created web page data to the language of the pre-stored different locale data.
8. The terminal according to claim 1, wherein the static locale-independent web page core data contains information about the company hosting the communication network.
9. The terminal according to claim 1, wherein the static local-independent web page core data contains customer service information.
10. The terminal according to claim 1, wherein the static locale-independent web page core data contains information pertaining to the terminal including the memory and the server.
11. A method for modifying a web page, comprising:
    pre-storing a database including the locale data and the different locale data in a memory located on a terminal prior to deployment of the terminal to a particular location, the pre-stored locale data and the pre-stored different locale data associated with static locale-independent web page core data containing information about a company hosting a communication network or a company deploying the terminal, the pre-stored locale data comprising web page content associated with the static locale-independent web page core data in a language specific to the particular location;
    controlling a server located on the terminal to request, in response to receiving a request for the web page from a browser of a user device separate from the terminal, the static locale-independent web page core data from the communication network, store the static locale-independent web page core data in a cache for retrieval in response to subsequent requests for the web page, and bind the pre-stored locale data with the static locale-independent web page core data to create web page data; and controlling the server to transmit the created web page data to the browser of the user device for display, receive a request from the browser for changing a language of the created web page data to a language of the pre-stored different locale data, bind the pre-stored different locale data to the static locale-independent web page core data to create modified web page data, and provide the modified web page data to the browser without refreshing the static locale-independent web page core data and without interrupting another function currently being executed in the static locale-independent web page core data.

12. The method according to claim 11, further comprising receiving the static locale-independent web page core data at the terminal from the communication network; and providing the static locale-independent web page core data to the server.

13. The method according to claim 11, further comprising controlling the server to store the static locale-independent web page core data in the cache upon receiving an initial request for the web page represented by the static locale-independent web page core data; and
controlling the server to retrieve the static locale-independent web page core data from the cache upon receiving a subsequent request for the web page.

14. The method according to claim 11, wherein
the controlling the server to bind the pre-stored different locale data with the static locale-independent web page core data includes replacing the pre-stored locale data with the pre-stored different locale data to create the modified web page data while the static locale-independent web page core data is generating an active web page.

15. The method according to claim 11, wherein
controlling the server to provide the modified web page data to the browser includes providing the modified web page data without interrupting any functionality of the static locale-independent web page core data.

16. The method according to claim 11, including
controlling the server to retrieve the pre-stored different locale data from the memory to provide the modified web page data to the browser in response to the request from the browser for changing the language of the created web page data to the language of the pre-stored different locale data.

17. A non-transitory computer readable medium of instructions for controlling a server, which is disposed at a terminal for use with in a communication network hosted by a company, to perform the following operations:
retrieve pre-stored locale data and pre-stored different locale data from a database stored in a memory located on the terminal, the pre-stored locale data and the pre-stored different locale data pre-stored on the database prior to deployment of the terminal to a particular location, the pre-stored locale data and the pre-stored different locale data associated with static locale-independent web page core data containing information about the company hosting the communication network or a company deploying the terminal, and the pre-stored locale data comprising web page content associated with the static locale-independent web page core data in a language specific to the particular location,
control the server located on the terminal to request, in response to receiving a request for a web page from a browser of a user device separate from the terminal, the static locale-independent web page core data from the communication network, store the static locale-independent web page core data in a cache for retrieval in response to subsequent requests for the web page, and bind the pre-stored locale data with the static locale-independent web page core data to create web page data, and
control the server to transmit the created web page data to the browser of the user device for display, receive a request from the browser to change a language of the created web page data to a language of the pre-stored different locale data, bind the pre-stored different locale data to the static locale-independent web page core data to create modified web page data, and provide the modified web page data to the browser without refreshing the static locale-independent web page core data and without interrupting another function currently being executed in the static locale-independent web page core data.

18. The non-transitory computer readable medium of instructions according to claim 17, which further controls a receiver at the terminal to receive the static locale-independent web page core data from the communication network, and provide the static locale-independent web page core data to the server.

19. The non-transitory computer readable medium of instructions according to claim 17, which further controls the server to store the static locale-independent web page core data in the cache upon receiving an initial request for the web page represented by the static locale-independent web page core data, and further controls the server to retrieve the static locale-independent web page core data from the cache upon receiving a subsequent request for the web page.

20. The non-transitory computer readable medium of instructions according to claim 17, which further controls the server to bind the pre-stored different locale data with the static locale-independent web page core data by replacing the pre-stored locale data with the pre-stored different locale data to create the modified web page data while the static locale-independent web page core data is generating an active web page.

21. The non-transitory computer readable medium of instructions according to claim 17, wherein
the non-transitory computer readable medium of instructions provides the modified web page data to the browser without interrupting any functionality of the static locale-independent web page core data.

* * * * *